May 28, 1963 A. LEVINE 3,091,705
PULSE FORMER UTILIZING MINORITY CARRIER STORAGE FOR STRETCHING OUTPUT AND DELAYER CONTROLLING SAID OUTPUT DURATION
Filed Jan. 28, 1960
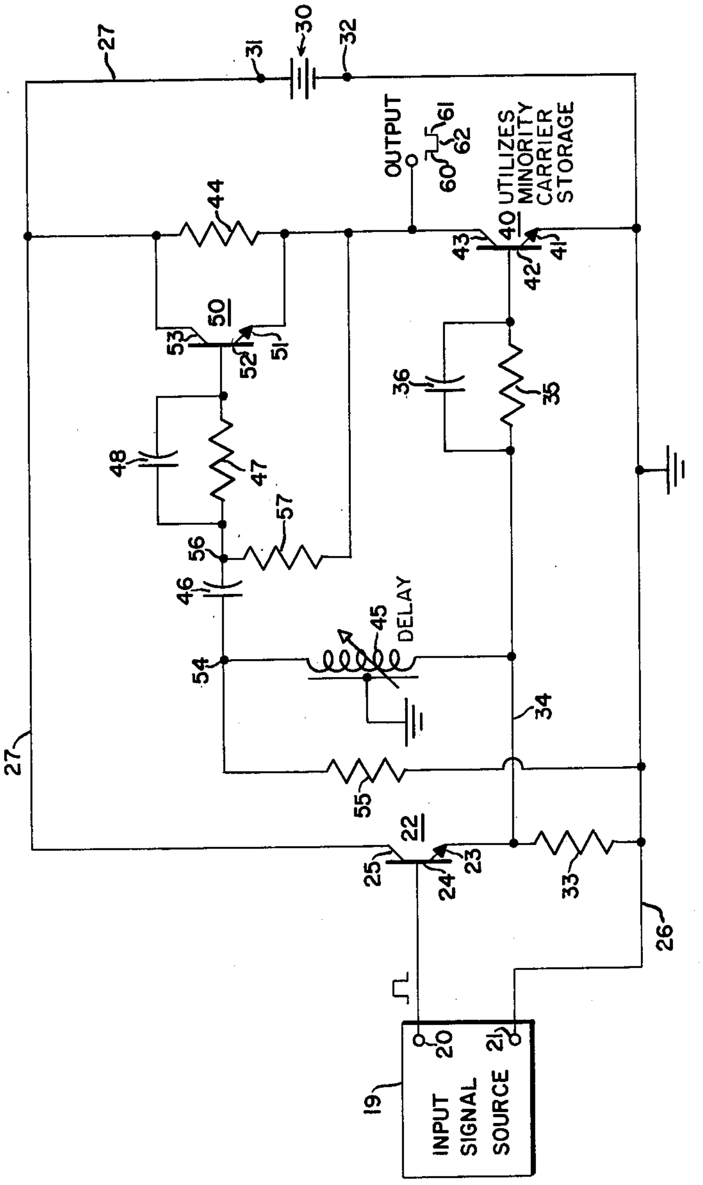
INVENTOR
ABRAHAM LEVINE
BY Roger W. Hensen
ATTORNEY 3,091,705
Patented May 28, 1963

3,091,705

PULSE FORMER UTILIZING MINORITY CARRIER STORAGE FOR STRETCHING OUTPUT AND DELAYER CONTROLLING SAID OUTPUT DURATION

Abraham Levine, St. Petersburg, Fla., assignor to Minneapolis-Honeywell Regulator Company, Minneapolis, Minn., a corporation of Delaware Filed Jan. 28, 1960, Ser. No. 5,219
8 Claims. (Cl. 307—88.5)

This invention relates to the improvement in transistorized precision pulse forming circuits and particularly to pulse forming circuits where the output pulse is of relatively short time duration. It is well known in the art that in transistor circuits, where the transistors are operated in the saturation region, storage effects adversely affect the fall time of the produced pulses.

It is one object of this invention, therefore, to provide a transistor pulse circuit wherein the transistor storage effects are minimized.

Another object of this invention is to provide a pulse circuit that produces a precision pulse width output.

A further object of this invention is to provide a pulse circuit wherein the width of the output pulse is determined by a variable delay means.

These and other objects of my invention will become apparent to those skilled in the art upon consideration of the accompanying specification, claims, and drawing of which:

The single figure is a schematic diagram of an embodiment of this invention.

Referring to the drawing there is shown an input signal source 19 having terminals 20 and 21. Terminal 20, of the input signal source, is connected directly to the base 24 of a transistor 22, having an emitter 23, and a collector 25. Terminal 21, of the input signal source, is connected directly to a common conductor 26, which is grounded. Collector 25, of transistor 22, is connected by means of a conductor 27 to a source of energization potential 30, in this case a battery, having terminals 31 and 32. Emitter 23, of transistor 22, is connected by means of a resistor 33 to the common conductor 26. Emitter 23 is also connected, by means of a conductor 34 and a parallel combination of a resistor 35 and a capacitor 36, to a base 42 of a transistor 40, also having an emitter 41, and a collector 43. The emitter 41 of transistor 40 is connected directly to the common conductor 26. Collector 43 of transistor 40 is connected by means of a resistor 44 to lead 27 and thus to terminal 31 of the battery 30.

Emitter 23 of transistor 22 is further connected by means of a delay line 45, a capacitor 46, and a parallel combination of a resistor 47 and a capacitor 48, to a base 52 of a transistor 50 also having an emitter 51 and a collector 53. In the preferred embodiment of the invention transistors 22, 40 and 50 have been used, but it should be understood that other current control devices, such as switches might be employed. Emitter 51 of transistor 50 is connected directly to the collector 43 of transistor 40, and the collector 53 of transistor 50 is connected through lead 27 directly to terminal 31 of the battery 30.

The base and emitter terminals, of the transistors shown in the drawing, are the input electrodes to the transistors while the collector and emitter are the output electrodes.

Terminal 54, between delay line 45 and capacitor 46, is connected by means of a resistor 55 to the common conductor 26. Terminal 56, at the junction between capacitor 46 and the parallel combination of resistor 47 and capacitor 48, is connected by means of a resistor 57 to the collector 43 of transistor 40.

The output pulse is taken from the collector 43 of transistor 40.

*Operation*

The pulse forming apparatus of the drawing comprises, in a broad sense, a means for producing an output pulse of precision pulse width by utilizing the characteristics of a delay line to control the timing signal applied to various transistor switches. The width of the output pulse is proportional to the time that the timing signal is delayed.

In considering the specific operation of the circuit of the drawing, assume that initially there is no input signal present. With the circuit in this condition, transistors 22, 40, and 50 will be nonconducting or "off." The capacitor 46 will be charged to a polarity such that terminal 56 is positive with respect to terminal 54. The charge path for this capacitor is from terminal 31 of battery 30, through resistor 44, resistor 57, capacitor 46, resistor 55, and common conductor 26 to battery terminal 32. The output terminal will be at the battery potential since transistor 40 is cut off and no voltage is dropped across resistor 44.

Assume now that there is a positive pulse applied to the base of transistor 22 from terminal 20 of the input signal source 19. Transistor 22 is an impedance matching device with a relatively high input impedance and a relatively low output impedance. The purpose of this transistor is to match the impedance of the input to the characteristic impedance of the delay line. With a positive pulse appearing at the input, current will flow from terminal 20 of the input signal source, through the base 24 to emitter 23 of transistor 22, resistor 33, and conductor 26 to terminal 21 of the signal source. This base current flow will bias transistor 22 "on," which will allow a larger current to flow from battery terminal 31, through conductor 27, collector 25 to emitter 23 of transistor 22, resistor 33, and conductor 26 to battery terminal 32. This larger collector current flow produces a positive pulse across resistor 33 which is coupled by means of conductor 34 and the wave shaping and impedance matching network comprising resistor 35 and capacitor 36, to the base 42 of transistor 40, and, by means of conductor 34, to the input of the delay line 45.

The positive pulse on the base 42 of transistor 40 produces a base emitter current flow and thereby biases this transistor to its "on" or conducting state. With transistor 40 "on," current will flow from battery terminal 31, through conductor 27, resistor 44, collector 43 to emitter 41 of transistor 40, and conductor 26 to battery terminal 32. This current flow produces a voltage drop across resistor 44 which will cause the output voltage on the collector of transistor 40 to drop. This drop in output voltage forms the leading edge 60 of the output pulse.

It should be understood that the duration of the input pulse occurring on the base 42 of transistor 40 is shorter than the duration of the output pulse. However, due to minority carrier storage effects in transistor 40 the input pulse width will be effectively stretched to increase the conduction time of transistor 40. A discussion of transistor minority carrier storage effects can be found in Handbook of Semiconductor Electronics, edited by Lloyd P. Hunter, McGraw-Hill Book Company, Inc., 1956, pages 4–20 through 4–22, 15–21 through 15–23, 15–32 through 15–34, and 15–48 through 15–51.

The drop in potential at the collector 43 of transistor 40 will cause the D.C. isolation capacitor 46 to discharge through resistor 57, collector 43 to emitter 41 of transistor 40, conductor 26, and resistor 55 to the other side of the capacitor. In other words, as the potential on the collector 43 of transistor 40 decreases, a voltage divider network is formed between resistor 57 and the parallel circuit comprising resistor 55 and the dynamic impedance of delay line 45. The wave front at this period of time is steep enough that capacitor 46 appears to be effectively a short circuit. Theoretically, transistor 50 could turn on at this time considering the time constant of capacitor 46 discharge path. Due to transistor 50 turn on time limitations, this momentary transient never appears at the output. Actual circuit operation verifies this point. The positive pulse that was simultaneously applied to the base of transistor 40 and the delay line 45 will, after a particular time determined by the characteristics of the delay line, produce a positive pulse at terminal 54 which will charge capacitor 46 to a polarity such that terminal 54 is positive with respect to terminal 56. This charging current for capacitor 46 will bias transistor 50 to its "on" state. The path for this charging current is from terminal 31 of battery 30, through conductor 27, collector 25 to emitter 23 of transistor 22, conductor 34, delay line 45, capacitor 46, the impedance matching and wave shaping network comprising resistor 47 and capacitor 48, base 52 to emitter 51 of transistor 50, collector 43 to emitter 41 of transistor 40, and conductor 26 to battery terminal 32. When transistor 50 is in its "on" condition, collector current flows from battery terminal 31, through conductor 27, collector 53 to emitter 51 of transistor 50, collector 43 to emitter 41 of transistor 40, and conductor 26 to battery terminal 32. This current flow effectively shorts out resistor 44 and returns the collector 43 of transistor 40, and hence the output potential, to the battery potential. This rise in potential at the output forms the trailing edge 61 of the output pulse. The pulse width 62 is a function of the time delay introduced into the circuit by the delay line, and can be varied by varying the delay line characteristics. As stated previously, the storage effect of transistor 40 is used to stretch the input pulse width until transistor 50 goes into conduction and returns the collector 43 of transistor 40 through a low impedance to terminal 31 of battery 30. In this way, the detrimental effects caused by minority carrier storage in transistor 40 are used to advantage. By limiting the input pulse width to a value such that it is always less than the value of the delay of delay line 45 the base drive on transistor 40 is cut off before transistor 50 goes into its conducting state. The minimum value of the input signal pulse width into base 24 of transistor 22 must be such that its minimum width plus the minimum storage time of transistor 40 is equal to or greater than the delay of delay line 45.

At the completion of the stretched input signal pulse, transistor 22 returns to its "off" state since there is no longer a bias current. When transistor 22 turns "off," it opens the base circuit of transistor 40 and transistor 40 also returns to its "off" state. When transistor 40 is "off," transistor 50 can not conduct due to the fact that its emitter circuit is open, so that the pulse circuit is again in its original state. When another input pulse appears at the base of transistor 22, the cycle will repeat.

It is to be understood that while I have shown a specific embodiment of my invention, this is for the purpose of illustration only and that my invention is to be limited solely by the scope of the appended claims.

I claim as my invention:

1. Pulse forming apparatus of the class described comprising: first and second semiconductor means each having input and output electrodes; delay means having first and second terminals; input signal means; circuit means connecting said input signal means to the input electrodes of said first semiconductor means and to the first terminal of said delay means; circuit means connecting the second terminal of said delay means to the input electrodes of said second semiconductor means, whereby said second semiconductor means is energized after said first semiconductor means is energized, and deenergized after said first semiconductor means is deenergized; resistance means; a source of energizing potential; circuit means connecting said resistance means and the output electrodes of said first semiconductor means in series relationship across said potential source; and means connecting the output electrodes of said second semiconductor across said resistance means.

2. Pulse forming apparatus of the class described comprising: first and second semiconductor means each having collector, base and emitter electrodes: delay means having first and second terminals; input signal means having first and second terminals; circuit means connecting the first terminal of said input signal means to the base electrode of said first semiconductor means and to the first terminal of said delay means; circuit means connecting the second terminal of said input means to a common conductor; circuit means connecting a second terminal of said delay means to the base electrode of said second semiconductor means, whereby the energization and deenergization of said second semiconductor means follows respectively the energization and deenergization of said first semiconductor means; resistance means; a source of energizing potential having first and second terminals; circuit means connecting said resistance means from the first terminal of said potential source to the collector electrode of said first semiconductor means; means connecting the second terminal of said potential source to said common conductor; circuit means connecting the emitter electrode of said first semiconductor means to said common conductor; and circuit means connecting collector and emitter electrodes of said second semiconductor means across said resistance means.

3. Pulse forming apparatus of the class described comprising: first, second, and third semiconductor means each having collector, base and emitter electrodes; variable delay means having input and output terminals; input signal means; circuit means connecting said input signal means from the base electrode to the emitter electrode of said first semiconductor means; first wave shaping and impedance matching means connecting the emitter electrode of said first semiconductor means to the base electrode of said second semiconductor means; circuit means connecting the emitter electrode of said first semiconductor means to the input terminal of said variable delay means; a source of energizing potential having first and second terminals; circuit means connecting the collector electrode of said first semiconductor means to the first terminal of said potential source; circuit means connecting the second terminal of said potential source to a common conductor; second wave shaping and impedance matching means connecting the output terminal of the delay means to the base of said third semiconductor means; resistance means, said resistance means being connected from said potential source to the collector electrode of said second semiconductor means; circuit means connecting the emitter electrode of the second semiconductor means to said common conductor; and circuit means connecting the collector and emitter electrodes of said third semiconductor means across said resistance means.

4. Pulse forming apparatus of the class described comprising: input signal means; impedance matching means having an input and output; circuit means connecting said input signal means to the input of said impedance matching means; first and second semiconductor means each having input, output, and common electrodes; variable delay means having an input and an output; circuit means connecting the output of said impedance matching means to the input electrode of said first semiconductor means and to the input of said variable delay means; circuit means connecting the output of the delay means to the input electrode of said second semiconductor means; potential means having first and second terminals; circuit means connecting the first terminal of said potential means to ground; resistance means, said resistance means being connected from the second terminal of said potential means to the output electrode of said first semiconductor means; circuit means connecting the common electrode of said first semiconductor means to ground; and circuit means connecting the output and common electrode of said second semiconductor means across said resistance means.

5. Pulse forming apparatus of the class described comprising: input signal means; impedance matching means having an input and output; circuit means connecting said input signal means to the input of said impedance matching means; first and second current control means each having input, output, and common electrodes; variable delay means having an input and an output; circuit means connecting the output of said impedance matching means to the input electrode of said first current control means and to the input of said variable delay means; circuit means connecting the output of the delay means to the input electrode of said second current control means; potential means having first and second terminals; circuit means connecting the first terminal of said potential means to a common conductor; impedance means, said impedance means being connected from the second terminal of said potential means to the output electrode of said first current control means; circuit means connecting the common electrode of said first current control means to said common conductor; and circuit means connecting the output and common electrode of said second current control means across said impedance means.

6. Pulse forming apparatus of the class described comprising: input signal means; impedance matching means having an input and output means connecting said input signal means to the input of said impedance matching means; first and second semiconductor means each having an input and an output; delay means having an input and an output; circuit means connecting the output of said impedance matching means to the input of said first semiconductor means and to the input of said delay means; circuit means connecting the output of the delay means to the input of said second semiconductor means; potential means; impedance means; circuit means connecting said impedance means and said potential means in a series relationship to the output and said first semiconductor means; and circuit means connecting the output of said second semiconductor means across said impedance means.

7. Pulse forming apparatus of the class described comprising: first and second current control means each having input and first and second output electrodes; delay means having an input and an output; input signal means having first and second terminals; first wave shaping and impedance matching means connecting the first terminal of said input signal means to the input electrodes of said first current control means; circuit means connecting the first terminal of said input signal means to the input of said delay means; means connecting the second terminal of said input signal means to a common conductor; second wave shaping and impedance matching means connecting the output of said delay means to the input electrodes of said second current control means, whereby the energization and deenergization of said second current control means follows respectively the energization and deenergization of said first current control means; impedance means; a source of energizing potential having first and second terminals; circuit means connecting the first terminal of said potential source to said common conductor; circuit means connecting said impedance means from the second terminal of said potential source to the first output electrode of said first current control means; means connecting the second output electrode of said first current control means to said common conductor; and means connecting the first and second output electrodes of said second current control means across said impedance means.

8. Pulse forming apparatus of the class described comprising: first switch means; impedance means; a source of energizing potential; circuit means connecting said switch means, impedance means, and potential source in a series relationship; second switch means; circuit means connecting said second switch means in parallel with said impedance means; delay means having an input and an output; a source of input signals; means connecting said signal source to the input of said delay means and to said first switch means so that said input signal simultaneously excites said delay means and operates said first switch means; and means connecting the output of said delay means to said second switch means in a controlling relationship so that said input signal, after a predetermined delay, operates said second switch means, the energization and deenergization of said second switch means following respectively the energization and deenergization of said first switch means.

References Cited in the file of this patent

UNITED STATES PATENTS

| | | |
|---|---|---|
| 2,446,802 | Bell | Aug. 10, 1948 |
| 2,572,849 | Francis | Oct. 30, 1951 |
| 2,633,528 | Huston | Mar. 31, 1953 |
| 2,636,119 | Forbes | Apr. 21, 1953 |
| 2,845,548 | Silliman et al. | July 29, 1958 |
| 2,896,171 | Erath | July 21, 1959 |